Oct. 19, 1965   W. B. DUFFY   3,212,391
THREADLESS STUD, AND FASTENER AFFORDING
FRACTIONAL TURN TIGHTENING
Filed Aug. 7, 1962

INVENTOR
WILLIAM B. DUFFY
BY
Charles F. Chisholm
ATTORNEY

United States Patent Office 3,212,391
Patented Oct. 19, 1965

3,212,391
THREADLESS STUD, AND FASTENER AFFORDING FRACTIONAL-TURN TIGHTENING
William B. Duffy, Berkeley Heights, N.J., assignor to United-Carr Incorporated, a corporation of Delaware
Filed Aug. 7, 1962, Ser. No. 215,388
2 Claims. (Cl. 85—36)

This invention relates to an assembly of sheet-metal fastener and threadless stud, the fastener being adapted to be pushed onto the stud and then turned to tighten it down. The word "stud" is used to designate the male member regardless of whether it is integral with another part of the assembly or is a separate member.

Many sheet-metal fasteners for threadless studs are known, some being well-suited for certain usages and others being well-suited for the same and/or different usages. All have limitations, however.

The rotative fasteners known to me which form a male thread on an initially threadless stud are more expensive than simple push-on fasteners; also they require considerable torque to apply if they are to have high holding-power. Some push-on fasteners known to me are easy to apply but have only low holding-power. The push-on fasteners known to me which develop high holding-force on the stud require relatively high force to apply.

Some push-on fasteners merely provide an abutment on a threadless stud, without tensioning the stud. These are not well-suited for use where an assembly free of play or lost motion is desired. Other push-on fasteners tension the stud, but only by spring-back of the fastener. The tensioning of the stud which these fasteners provide is not as large and as certain as is desirable for some usages.

Some of the known fasteners for threadless studs, both rotative and push-on, take up more space outwardly of the axis of the stud than would be available in some instances.

While the present assembly and fastener necessarily have limitations too, the present assembly and fastener are well-adapted for certain usages. For those usages the present assembly of sheet-metal fastener and threadless stud, and the present fastener for such assembly, have advantages over the assemblies and fasteners known to me.

By the use of the assembly and fastener of the present invention the following advantages may be obtained: (a) the fastener may be quickly applied to the stud as in the case of a push-on fastener, (b) by rotation of the fastener, usually only a fraction of a turn, after it has been pushed onto the stud, the assembly may be tightened and tension the stud as in the case of a rotative fastener, (c) telescoping of the fastener onto the stud by relatively small force may be achieved and, nevertheless, high holding-force of the fastener on the stud be obtained, (d) the space occupied by the fastener may be reduced to a minimum and (e) the cost of the fastener may be reduced as compared to the cost of known fasteners which will give comparable performance.

Other objects and advantages will be apparent from the drawings and the description hereinafter.

One use for which the present invention is well-suited is in the attachment to a supporting body or plate of thin aluminum trim having soft aluminum studs resistance-welded to the trim.

In attaching trim to automobile bodies and other supporting plates it is customary to provide the trim with a series of spaced studs. Each stud is inserted through a hole in the automobile body or other supporting plate; then a fastener is affixed to each stud. When the trim is thin aluminum and has soft aluminum studs resistance-welded thereto, the fasteners known to me leave much to be desired. The rotative fasteners known to me are not only relatively expensive but are too severe on the soft aluminum studs, not infrequently twisting the studs loose at the weld. A push-on fastener that requires relatively high force to telescope the fastener onto the stud forces the stud outwardly and tends to produce a bulge in the aluminum trim. A push-on fastener which does not tension the stud is unsuitable because it does not produce a tight assembly free of lost motion. A push-on fastener which tensions the stud by spring-back of the fastener does not tension the stud sufficiently to overcome the effect of burrs, deformations, etc. which may temporarily prop the aluminum strip away from the body or other supporting plate and, as a result, a sufficiently tight assembly is not assured.

For clarity and convenience the assembly and the fastener will be referred to on the basis of the stud being vertical, the fastener advancing downwardly on the stud as the fastener is applied, and the face of the fastener which is toward the upper end of the stud being the top of the fastener. However, no limitation as to the positioning of the assembly is to be implied, since the fastener-and-stud assembly may be placed in any oriented position. Also, in both the description and the claims, parts at times may be identified by specific names for convenience and ready understanding, but such nomenclature is to be understood as having the broadest meaning consistent with the context and with the concept of my invention as distinguished from the pertinent prior art. The best mode in which I have contemplated carrying out my invention is illustrated in the accompanying drawing, forming part of this specification. Except as may be otherwise indicated, the description refers to the specific form of the invention shown in the drawing; it does not necessarily refer to any other form in which the invention may be embodied.

Figure 1:
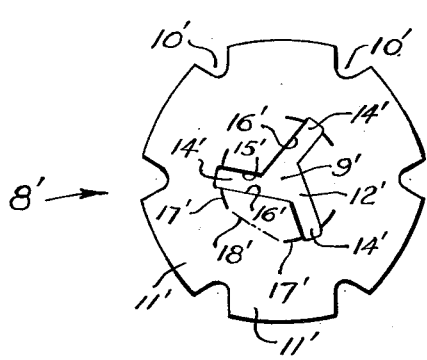
FIGURE 1 is a top plan view of a blank from which a fastener of the present invention may be formed.

In the drawings the thickness of sheet metal is necessarily exaggerated.

Various features of the fastener occur in sixes. To avoid cluttering the drawing with reference characters, no reference character will be applied to such a feature more than twice in any one figure. Additional occurrences of the feature will be apparent.

In FIGURE 1 the sheet-metal blank 8' is pseudo-circular with its center at 9'. Six equally spaced edge-notches 10', of the form shown, divide the edge zone of the blank into six like tabs 11'. The outer end of each tab is arcuate but on a radius which is longer than the radial distance from the blank-center 9' to the center of the outer end of the tab.

Centered with respect to the configuration of the blank there is a three-slot opening that is designated as a whole by 12'. Each of the three slots 14' has a short longitudinal edge 15' and a long longitudinal edge 16'. The short longitudinal edges 15' extend radially from the blank-center 9' and are 120° apart. Merging with each slot 14' near its outer end are two circumferentially-extending slits 17', one associated with the slot-edge 15' and the other associated with the slot-edge 16'.

The blank 8' of FIGURE 1 is formed into the fastener 8 shown in FIGURES 2 through 6. The six blank-tabs 11' are folded into vertical planes and brought into edge-to-edge contact. This provides the fastener with a hexagonal shell. The shell has six flats or wrench faces 11 and, at each corner of the shell, a slit 13 extends downwardly from the top of the shell. As a result of drawing of the metal, the hexagonal shell has a short seamless portion 20 (FIGURE 4) which lies below the metal from the blank-tabs 11'.

Figure 2:
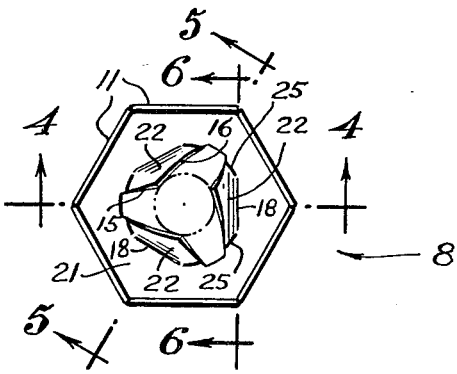
FIGURE 2 is a top plan view of a fastener of the present invention, formed from the blank of FIGURE 1. The stud circle, at the level where the stud may be engaged by the fastener when applied, is indicated in dot-dash lines.
Figure 3:
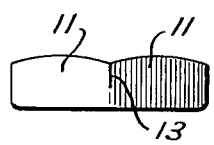
FIGURE 3 is an edge view of the fastener of FIGURE 2, looking from either side of FIGURE 2.
Figure 4:
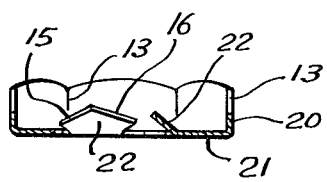
FIGURE 4 is a sectional view of the fastener of FIGURE 2, taken on the line 4—4 of FIGURE 2.
Figure 5:
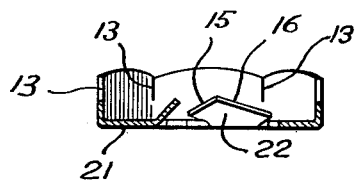
FIGURE 5 is a sectional view of the fastener of FIGURE 2, taken on the line 5—5 of FIGURE 2.

Extending across the bottom of the shell, and homogeneous therewith, is a web 21. Bent upwardly from the web, and disposed at an angle of 45° thereto, are three stud-engaging teeth 22. Each tooth is bent upwardly along the straight line 18 of FIGURE 2, the line 18 corresponding to the bend line 18' of the blank (FIGURE 1) and being the line of joinder of the tooth 22 with the web 21. As is seen in FIGURE 2 each line 18 is perpendicular to a radius passing through a corner of the shell and extends for a substantial distance on each side of such radius. As is also seen in FIGURE 2 each line 18, in projection, extends approximately through the two corners of the shell that are on opposite sides of the aforesaid radius and are 120 degrees apart.

Each tooth is broad—so broad that it spans a sector of approximately 100°, half on one side of a radius passing through a corner of the hexagonal shell and half on the other side of such radius. Each tooth is composed of blank-metal bounded by (a) a slit 17' which is associated with a slot-edge 16' (b) the associated slot-edge 16' (c) the adjacent slot-edge 15' (d) the slit 17' which is associated with that slot-edge 15', and (e) a line 18' on which the tooth is bent upwardly from the web. As shown in FIGURE 1 the slits 17' are substantially constant-distant from the center 9' of the blank 8'. In the formed nut 8 this causes each end of each tooth 22 to be separated from the web 21 by a severance that is substantially constant-distant from the axis of the fastener, as is shown in FIGURE 2.

Each tooth 22 has a neck portion 24 (FIGURE 6) which is homogeneous with the web 21 and, at each side of the neck portion, each tooth has a circumferentially-extending shoulder 25 (FIGURES 6 and 2) which is separate from the web. Also, each tooth has a stud-biting edge 16 which is inclined circumferentially-upward. And each tooth has an edge 15 which is inclined circumferentially-downward.

Figure 7:
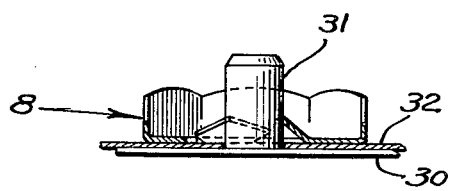
FIGURE 7 is a sectional elevation showing a stud-and-fastener assembly of the present invention, the fastener of FIGURES 2 through 6 being incorporated in the assembly.

In FIGURE 7 a piece of thin aluminum trim 30 has a series of soft aluminum studs welded thereto, one stud 31 being shown. The stud 31 passes through the metal 32 of an automobile body or other supporting plate. A fastener 8 is on the stud, tensioning the stud and drawing the trim 30 firmly against the supporting plate 32.

I make the fastener of spring steel and harden and temper it after forming. Thus the entire fastener is springy. For a given nominal size of stud, I place the teeth of the fastener in confronting relationship such that, upon the fastener being pushed onto a stud having the maximum minus tolerance, the teeth 22 will engage the stud with adequate spring pressure. As the fastener is pushed onto the stud the teeth 22 slide along the stud in springy engagement therewith.

After the fastener 8 has been pushed to substantially final position on the stud with a socket wrench it is rotated with the wrench, e.g. about one-third of a turn. The stud-biting edges 16 of the teeth form helical grooves on the stud and act in screw-thread fashion to advance the fastener to final position on the stud—thereby taking up lost motion and rendering the assembly snug.

Figure 8:
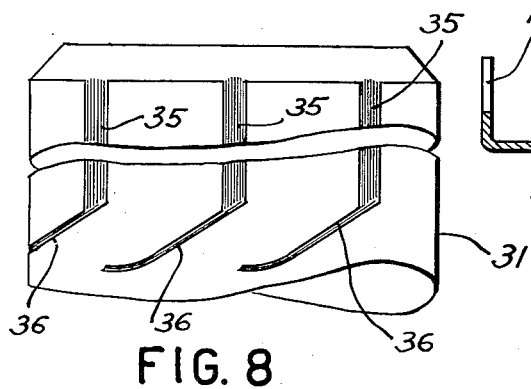
FIGURE 8 is an enlarged plane-development of the surface of a stud to which the fastener has been applied, showing grooving of the stud by the fastener.
Figure 6:
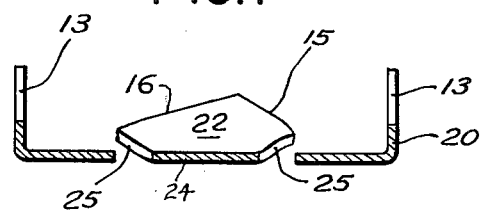
FIGURE 6 is an enlarged detail section on the line 6—6 of FIGURE 2, showing one of the three teeth of the fastener. For clarity of illustration nothing is shown in this view except the one tooth and the metal of the fastener at the line of the section.

As the fastener is pushed onto the stud the stud-biting edge 16 of each tooth scratches the stud vertically as indicated at 35 in FIGURE 8, the vertical center lines of the scratched areas being 120° apart. When the fastener is rotated to tighten the assembly, the stud-biting edge 16 of each tooth helically grooves the stud as indicated at 36. Due to flexure of the teeth under the load imposed upon them as the fastener is turned home, the inclination of the lower ends of the grooves 36 is modified in the manner shown in FIGURE 8. Ordinarily the fastener is pushed to substantially final position on the stud before being rotated and, therefore, the grooves 36 are only on a lower portion of the stud and are short lengthwise of the stud.

The tensioning of the stud as the fastener is rotated to final position sets up reactive forces tending to collapse the teeth 22 and force them toward the web 21. The broad circumferential extent of the teeth enables them to withstand this collapsing force without buckling of the teeth, even with relatively high tensioning of the stud. At the same time I make the neck 24 of the teeth sufficiently narrow to enable the teeth to readily flex outwardly as the fastener is pushed on the stud, whereby the fastener can be pushed on without imparting thrust to the stud sufficiently to produce a dimple in the thin aluminum trim 30.

In tests of the fastener 8 on studs of ⅛" nominal diameter, I have found push-on forces and ultimate strengths or holding forces as follows:

| Character of stud | Average push-on force, lbs. | Average ultimate strength or holding force, straight pull axially of the stud, lbs. |
| --- | --- | --- |
| Aluminum | 14 | 44.5 |
| Cold-drawn steel | 26.5 | 259 |
| Steel, zinc-electroplated plus chromating | 25 | 200 |
| Die-cast zinc | 13 | 35 |
| Brass | 23 | 116.6 |
| Plastic (medium impact polystyrene) | 30 | 60 |

In making a fastener 8 for a stud of ⅛" nominal diameter I have used spring-steel stock .011" thick, made the over-all height of the fastener .100", made the outside diameter between opposite wrench faces .371", given each tooth-neck 24 a circumferential extent of 65°, given each tooth-shoulder 25 a circumferential extent of 18°, and inclined each stud-biting edge 16 circumferentially upward at a pitch corresponding to eight threads per inch.

Unlike most fasteners that are pushed on threadless studs, the present fastener is readily removable. Under continued reverse rotation it will back off of the stud in the same manner as a threaded nut on a threaded stud.

While I believe three to be the best number of teeth for my fastener, I contemplate also making it with two oppositely-disposed teeth. Using only two teeth I would enlarge the circumferential extent of each tooth and broaden the neck portion of the tooth which is homogeneous with the web.

I claim:

1. A member; a threadless stud passing through the member; and a load-sustaining sheet-metal fastener for making clamping engagement with the member, the member being considered to be horizontal and the stud being considered to extend vertically upward through the member, said fastener having an axis which is coincident with the axis of the stud, said fastener being formed from relatively thin spring steel and being applicable to the stud by pushing the fastener downwardly on the stud into proximity with said member and then rotating the fastener to tighten it against the member, the bottom of the fastener being formed for rotative sliding-engagement with the member as the fastener is tightened against it, said fastener being nondestructively removable from the stud by counter-rotation of the fastener, the counter-rotation backing the fastener off the stud in much the same manner that counter-rotation of a threaded nut backs it off a threaded stud, and said fastener comprising:

a hexagonal shell which is coaxial with the stud and surrounds the stud in spaced relation thereto, said shell having six corners evenly distributed about the periphery of the shell;

a flat web homogeneous with one end of the shell and extending inwardly therefrom, said web being disposed perpendicularly to the axis of the stud;

and three stud-engaging teeth, no more and no less, adapted to slide along the stud in resilient engagement therewith when the fastener is pushed onto the stud, all of the teeth engaging the stud at the same distance from the bottom of the fastener, and the teeth being relatively short radially of the fastener, each tooth being a flat piece of sheet metal which is disposed at a steep angle to the web and leans toward the stud, each tooth being bent upwardly from the web along a straight line of joinder therewith, said line of joinder being perpendicular to a radius passing through a corner of the shell, and said line of joinder extending for a substantial distance on each side of such radius, said line of joinder, in projection, extending approximately through the two corners of the shell that are on opposite sides of said radius and are 120 degrees apart, each tooth having a broad base adjacent to the web, and having two edges which extend from the ends of the base respectively and which intersect at an obtuse angle, one edge being longer than the other, the longer edge leading and the shorter edge trailing when the fastener is rotated to tighten it, the longer edge being upwardly inclined and resiliently engaging the stud, the longer edges of the three teeth taken collectively reacting with the stud, when the fastener is rotated to tighten it, to advance the fastener on the stud and tighten it against said member through which the stud passes, and at least one end of the base of each tooth being separated from the web by a severance which is substantially constant-distant from the axis of the fastener.

2. An organization as in claim 1 in which both ends of the base of each tooth of the fastener are separated from the web by severances which are substantially constant-distant from the axis of the fastener.

References Cited by the Examiner

UNITED STATES PATENTS

| 1,899,715 | 2/33 | Olson | 85—36 |
| 2,055,130 | 9/36 | Hotchkin. | |
| 2,336,094 | 12/43 | Hall | 151—30 |
| 2,577,319 | 12/51 | Feitl | 85—36 |
| 2,754,717 | 7/56 | Becker | 85—36 |
| 2,862,413 | 12/58 | Knohl | 85—36 |
| 2,969,705 | 1/61 | Becker | 85—36 |
| 2,986,059 | 5/61 | Duffy et al. | |

FOREIGN PATENTS

| 994,694 | 3/54 | France. |
| 379,842 | 4/40 | Italy. |

EDWARD C. ALLEN, *Primary Examiner.*